(12) United States Patent
Rufo, Jr. et al.

(10) Patent No.: US 6,213,330 B1
(45) Date of Patent: Apr. 10, 2001

(54) THERMOPLASTIC STORAGE CONTAINER HAVING A BREAK AWAY ENGAGING MEANS

(75) Inventors: George Rufo, Jr., Dalton; Alvin Thomas, Pittsfield, both of MA (US)

(73) Assignee: Lakewood Industries, Inc., Pittsfield, MA (US)

( * ) Notice: Subject to any disclaimer, the term of this patent is extended or adjusted under 35 U.S.C. 154(b) by 0 days.

(21) Appl. No.: 08/149,632

(22) Filed: Nov. 9, 1993

(51) Int. Cl.[7] .............................. B65D 85/57; B65D 17/00
(52) U.S. Cl. ............................ 220/266; 206/1.5; 206/807
(58) Field of Search .................................. 206/1.5, 308.2, 206/387.11, 807; 220/265, 266, 337, 338

(56) References Cited

U.S. PATENT DOCUMENTS

| | | | |
|---|---|---|---|
| 3,494,458 | * 2/1970 | Meierhoefer | 220/265 |
| 3,604,596 | * 9/1971 | Khoury | 206/807 |
| 4,425,999 | * 1/1984 | Mac Donald | 206/1.5 |
| 4,598,824 | * 7/1986 | Long | 220/338 |
| 4,658,955 | * 4/1987 | Eichner | 206/807 |
| 4,711,372 | * 12/1987 | Gach | 206/807 |
| 4,763,732 | * 8/1988 | Neal | 220/265 |
| 4,821,910 | * 4/1989 | Poirier | 220/266 |
| 4,974,735 | * 12/1990 | Newell | 220/265 |
| 5,148,914 | * 9/1992 | Budert | 206/807 |
| 5,238,134 | * 8/1993 | Knapp | 220/266 |
| 5,285,918 | 2/1994 | Weisburn | 220/265 |
| 5,356,027 | 10/1994 | Craft | 220/338 |
| 5,385,231 | * 1/1995 | Nowotny | 206/807 |

* cited by examiner

Primary Examiner—Randall E. Chin
(74) Attorney, Agent, or Firm—William F. Mufatti, Esq.

(57) ABSTRACT

This invention is directed to providing detecting means on a thermoplastic mold part comprising a cover and a base panel or comprising a cap enclosure and a bottle. The detecting means comprises an interlocking break-away tab which upon initial opening of the container, the tab breaks away. This is particularly useful with compact disc or cassette containers. This invention is also directed to a thermoplastic container having a pivotal hinged cover and base wherein the hinge pin is of a particular design for securing the pivotal cover and base panels at the hinge end.

14 Claims, 7 Drawing Sheets

Figure 6:
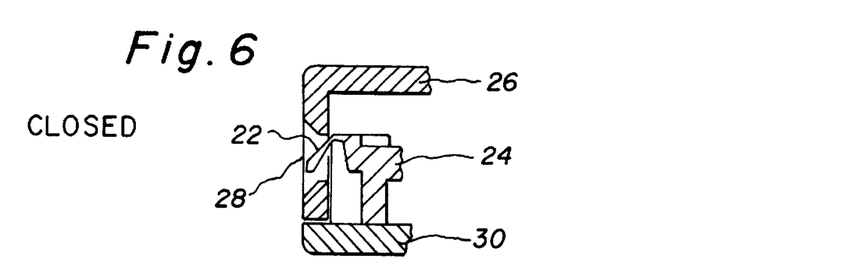

Fig. 6
CLOSED

Fig. 7

OPENING

OPEN

THERMOPLASTIC STORAGE CONTAINER HAVING A BREAK AWAY ENGAGING MEANS

FIELD OF THE INVENTION

The present invention is directed to providing a molded thermoplastic storage container having locking means which engage upon closing of the container and which upon initial opening of the container, the locking means break away. This affords detection by any subsequent user or purchaser of the container that it had been previously opened.

This invention is also directed to a pivotal hinged container having a particular hinge pin design for securing the pivotal cover and base panels at the hinged end.

BACKGROUND OF THE INVENTION

In today's market arena, it becomes increasingly more important that packaging be so designed so as to offer tamper evidence that a container had not been previously opened. This is of particular concern in the consumer field wherein orally ingested materials are stored in plastic containers. It is necessary that such containers have detectable or demonstrable evidence of having been tampered with or opened. Another area is the storage container for a recording medium such as the digital recording medium, particularly compact discs (CD). Compact discs come in a variety of different sizes (including a micro-disc) and may be used to digitally record sound (audio-CD's), images (photo-CD's) and data (CD-ROM's) and combinations thereof. While the present invention is particularly illustrated with respect to CD's, the principles hereof are applicable to any area of thermoplastic moldeding medium, particularly compact discs (CD). Compact discs come in a variety of different sizes (including a micro-disc) and may be used to digitally record sound (audio-CD's), images (photo-CD's) and data (CD-ROM's) and combinations thereof. While the present invention is particularly illustrated with respect to CD's, the principles hereof are applicable to any area of thermoplastic molded or formed storage containers where evidence is wanted to demonstrate that the container had been previously tampered with or opened, such as plastic bottles with caps, thermoplastic containers for cosmetics, storage containers for single or multiple CD's, storage containers in general, etc.

In the CD storage container field, for example, a variety of problems are faced by the CD manufacturers. One such problem is pilferage of the compact discs themselves. Another problem is where one may substitute a used or different compact disc for the one or ones in the compact disc container. A further problem is in the after market for compact discs wherein unsold and supposedly unused compact discs are returned for subsequent selling through discount markets or other outlets. The question facing the industry, however, is how to determine if a compact disc container had been previously opened. One solution has been to place, what is commonly referred to as a "dog bone" tape over one end of the container, preferably the end to be opened. In this manner, theoretically, when the box is opened, the tape is broken indicating that the container had been previously opened. However, it had been discovered that this "dog bone" tape can be wholly or partially removed without breaking or tearing the tape and then replaced, thereby demonstrating to any future user thereof that the container had not been opened, when in fact it had been opened. Also, with CD containers, the "dog bone" tape need not even be removed, since access to the CD holder compartment can be had through the hinged section of the CD container by merely separating the ends of the cover of the CD container at the hinged section.

Therefore, an object of this invention to provide means whereby it can be visually determined that a storage container had been previously opened.

It is another object of this invention to provide means to visually determine that a storage container for compact discs had been previously opened.

Yet another object of this invention is to provide a storage container for compact discs employing a break-away tab which upon initial opening of the container, the tab breaks away.

Further, another object of this invention is to provide a thermoplastic resin molded bottle and cap container having a break-away tab molded in the bottle and cap structure such that the tab breaks away on initial opening, thereby demonstrating that the bottle had been previously opened.

Still another object of this invention is to provide a hinged container wherein the hinged section of the container has a locking means locking the container at the hinged section when the container is in the closed orientation position and yet the hinged sections would still be rotatable around a hinge pin.

DETAILED DESCRIPTION OF THE INVENTION

In its broadest scope, it has now discovered that an interlocking break-away tab can be molded into the cover and base of a thermoplastic storage container, which upon the opening thereof, the tab breaks away. This then demonstrates to any subsequent user or purchaser thereof that the container had been previously opened or with which it had been tampered.

This invention finds utility in the thermoplastic container field wherein thermoplastic containers are employed for the storage of such items as medicines, vitamins, soft-drinks, juices, other liquid beverages, recording mediums (tapes, discs, and so on), cosmetics, other bodily used materials or other ingested items, etc., and specifically, storage containers for one or more compact discs (CD). Such CD storage containers comprise at least one pair of panels, namely a cover and a base panel secured together by a pivotal hinge means, which hinge means may be a hinge leaf, such as a plastic living hinge leaf, or the panels may be pivotably hinged at one end thereof by hinge pins molded in situ. Regardless of the hinge means, the panels are movable between a closed storage orientation position and an open orientation position. In the pivotable hinge pin attachment means, the attachment may be at the end of the panels wherein the one end of one panel has protrusions which mate with and snap into indentations or openings provided at the corresponding end of the other panel so as to provide a movable cover from a base panel. The cover panel of the container in the closed position may overlap the base panel. In the compact disc storage container, there are means for engaging and holding one or more compact discs, which engagement means may consist of a rosette for engaging the center hole of a compact disc. The containers, particularly containers for CD's, also have means for inserting graphics or a booklet. Such means are not critical to this invention and are well known in the art.

In a preferred embodiment of this invention, the break away means comprise a tab on one panel of a storage container which upon initial closing of the one panel onto the other panel, the tab engages a window, opening or lip on the opposite or other panel of the storage container. Thus, upon opening of the storage container, the tab breaks away, thereby demonstrating to any subsequent user, purchaser, etc. that the container had been previously opened. As stated previously, the invention is suitable for any storage container made or molded out of a thermoplastic resin where the break-away tab and engagement means can be molded in as part of the container, thereby not requiring any subsequent operation. This finds particular use for containers employed in the recording medium, namely CD containers, wherein the storage container preferably has a rotatable upper and lower panel. The storage container may have one or more of such interlocking break-away tab and window engagement means. Obviously, it is necessary that the break-away tab be so dimensioned that the tab will not break upon initial closing of the container but will break away upon opening the container thereafter. The dimensions of the tab depend on, but are not limited thereto, the size of the container, the method of opening and the design of the break-away tab. Also, if the break-away tab of this invention is not visible for whatever reason such as being so small that it is not easily detected by the eye or the color blends in with the color of the container, the break-away tab may be molded of a different color or it may have a different colored identification mark thereon. On the other hand, a scanning device may be employed to determine if the break-away tab is in place or broken away. Such a scanner would be desirable if large quantities of containers are being viewed.

Another embodiment of this invention is a container for compact discs. Such containers as stated previously comprise a cover panel, a tray or trays for receiving and holding one or more compact discs and a base panel wherein the cover panel overlaps the base panel and are pivotably hinged at one end thereof. In this embodiment, one of the panels has a protrusion on at least one side wall and the side wall of the other panel has a window for mating with the protrusion part when in the closed orientation position after initial closing of the panels. Then upon initial opening of the CD container, the protrusion breaks away that part of the window over which it laps or engages. The protrusion may be on either the side wall of the cover panel or of the base panel or of the tray. The corresponding window which mates with the protrusion is preferably in the side wall of the cover or base panel.

Another embodiment of this invention is directed to an improved storage container for compact discs (CD) comprising a cover panel and a base panel with a tray therebetween for receiving and storing one or more compact discs, wherein the cover and base panels are pivotably hinged at one end thereof and are movable between a closed storage orientation position and an open orientation position, the improvement comprises a hinge pin preferably at one end of the cover panel on the inside of both sides of the cover panel, having a key protrusion on the hinge pin. This hinge pin with a key protrusion thereon is then meshable with a corresponding opening and key slot in the side of the base panel at the hinged end so as to receive the cover panel hinge pin and key protrusion when the panels are in the open orientation position. Upon closing the cover panel which overlaps the base panel, the storage container is then in a locked, closed orientation position. This locking mode is at the pivotable hinged end of the rotatable panels. As such, when in the closed orientation position, the storage container cannot be opened or pried apart at the hinged end of the storage container without breaking the container, yet the cover can be continuously rotatable from a closed to an open or from an open to a closed orientation position. This locking hinge device can be employed separately or in combination with the interlocking break-away tab of this invention, such as, for example, the interlocking break-away tab being situated at one end of the storage container opposite that of the hinged end of the storage container employing the locking hinge means of this invention. While the pivotably hinged locking means of this invention can be employed without employing the interlocking break-away tab as described previously, it is preferred that they be employed in combination. Such CD storage containers are commonly referred to as "jewel boxes" and may hold one or more compact discs.

In another embodiment of this invention, the hinge pin may have, instead of a key protrusion, a cam at the end of the hinge pin. Correspondingly, the opening at the hinge end of this base panel is such that the hinge pin with the cam is meshable with the opening in the base panel when in the open orientation position. Again, the cover panel may be continously rotatable from the base panel.

The actual design feature of the hinge locking means is not critical, other than the hinge pin and opening must be meshable when the panels (cover and base) are in the open orientation position and locked when the panels are in the closed orientation position. By locked it is meant that the panels cannot be separated at the hinged end without breaking of the panels at the hinged end other than rotatably opening and closing the panels. Another variation can be a tab protruding from only part of the hinge pin. Instead of being a key, as previously described, the tab can be in essence a modified key.

As stated previously, it is preferred that the hinge pin of this invention lock the panels when in a closed orientation position so that the panels cannot be opened at the hinged section without breaking the panels. However, when employing a tab or modified key protrusion, the panels can be a snap-fit type without requiring a meshable opening, as described previously. In such an embodiment, the panels can be separated at the hinged section without breaking the panels. This snap fit is also part of this invention, even though locking does not take place to the extent that breaking of the panels would be necessary to open them at the hinged end when in a closed orientation position. This type of snap-fit hinge pin is applicable for any thermoplastic container, wherein it is molded in situ as part of the molded article. It is particularly useful for cassette and CD containers. In today's market, there is a demand for thinner-walled CD and cassette containers. As such, they become very flexible, and the ends of the panels where they pivotably hinge together do not have a tendency to stay together, particularly during automation loading or assembly of the container. While this is not a locking hinge as defined earlier herein, it is, nevertheless, an embodiment of the hinge pin of this invention wherein the hinge pin, in essence, engages the panels to a point where the ends of the panels or container hold together. By this, it is meant that the hinged ends are not easily separated. Force is required to separate the panels at the hinge end but not sufficient to break the panels, as with the locking embodiment described earlier. The panels can be snapped together at the hinged end whether or not the panels are in the open or closed orientation position.

As used in the present invention, the interlocking break-away tab is a technique well suited for use with plastic parts, namely as in one of the preferred embodiments of this invention, comprises a break-away tab and engaging lip. This method allows two mating items to be attached through an interlocking configuration molded into the parts themselves. The force required to assemble the components (close the panels) and the allowable deflection of the part can also be modified by the design of the configuration of the mating parts. The break-away tab is so designed as to have a thin walled section which upon opening the storage container herein described, the tab breaks away, thereby putting any subsequent user of the container on notice that it had been previously opened or with which it had been tampered. However, the break-away tab must also be so designed that it can withstand the pressure of initial closing, i.e. deflection of the tab so as not to break when the parts are initially closed, but which tab will break away upon initial opening.

When opening a container of the CD type where the interlocking break-away tab and mating part are part of one panel and tray that holds the CD recording medium, it may be necessary to provide means for holding the tray in place upon opening the CD container. This depends on the size of the break-away tab. For example, the break-away tab may be of such a size that when initially opening the cover of the container, it may cause the tray to also lift with the cover. Therefore, a means to hold the tray in place may be necessary.

There are generally two basic types of such interlocking devices sometimes referred to as snap-fit, namely the cantilever snap-fit or the annular snap-fit. The cantilever snap-fit is better described as a protrusion extending from the nominal wall of a part with a hook or bead or slot at the end to allow the part to interlock with its mating piece. The interlocking break-away tab device of this invention is generally molded as a cantilever beam.

The other basic type of snap-fit is referred to as an annular snap-fit. The annular snap-fit is comprised of two mating parts generally circular or elliptical in shape. One of the mating parts has a protrusion which runs around the circumference of the part, forming a lip. Generally, an annular snap-fit is described as "molded as a beam of infinite length resting on a resilient foundation". While the annular snap-fit may not typically be usable in the present invention, the concept, however, of a cantilever snap-fit is applicable to the bottle cap and bottle locking break-away tab of this invention which generally may have an annular screw cap or snap-fit cap. When the screw cap or snap fit cap is opened, employing the cantilever type interlocking or snap-fit technique, the tab will break away, thereby demonstrating that the bottle had been previously opened. Therefore, this invention is applicable to a plastic bottle and cap closure. While a screw cap closure is subsequently described, the break-away tab is also applicable to a snap-on or snap-fit cap closure.

DETAILED DESCRIPTION OF THE DRAWINGS

Figures 1, 2:
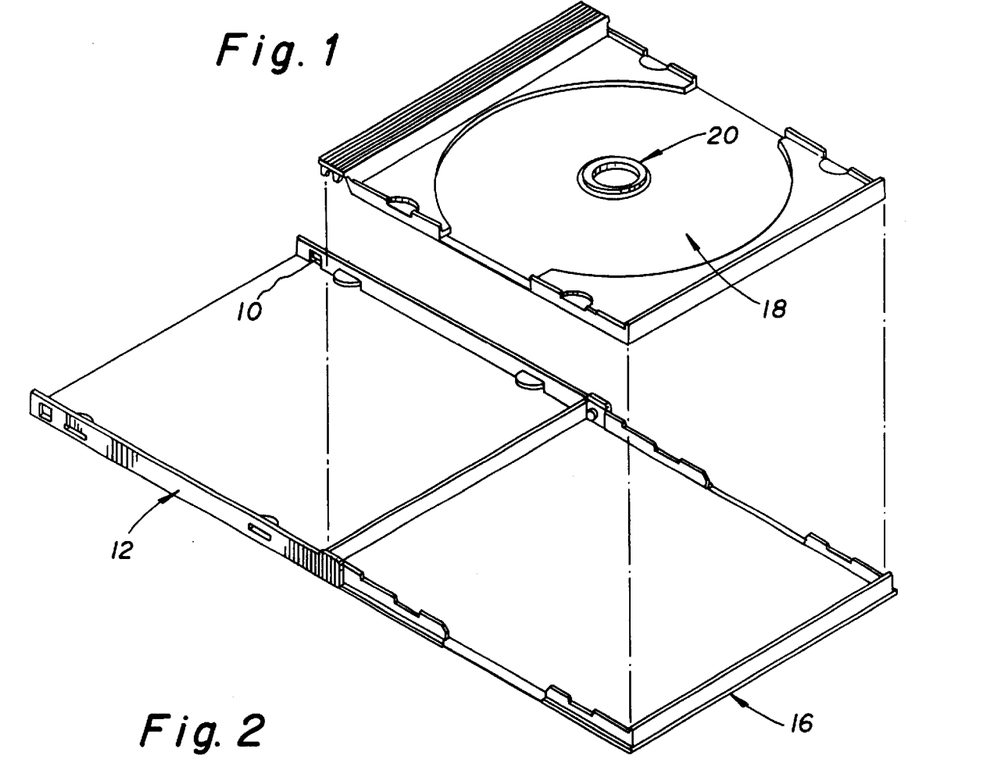

In FIG. 1, lock tab 10 is part of cover 12 of a compact disc container (jewel box) consisting of cover 12, base 16 and tray 18 having an engagement means 21 for holding a compact disc.

FIG. 2 is a cut away or sectional drawing through the locking means of the compact disc container in the closed locking orientation position showing the cover 12, locking tab 10, tray 18, and base 16 engaged in the locked position wherein lip 20 on tray 18 engages locking tab 10.

Figure 3:
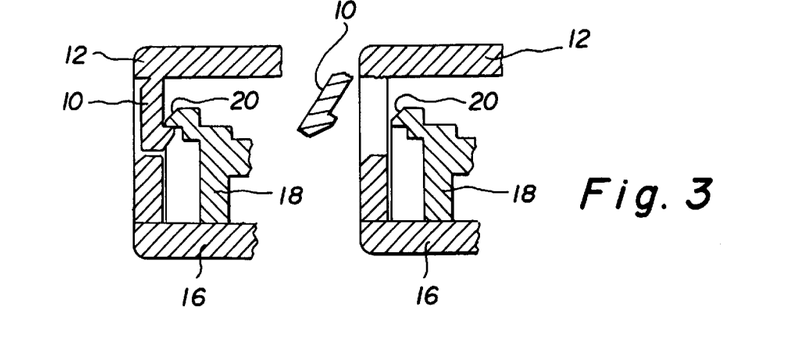

FIG. 3 is a cut away or sectional drawing of the same compact disc container of FIG. 2, but in the unlocked position, i.e. after initial opening of the container, showing that upon opening of the container, lock tab 10 is broken away from cover 12 by lip 20 on tray 18 sitting on base 16. The sectional drawing is through the locking means after initial opening of the jewel box.

Figure 4:
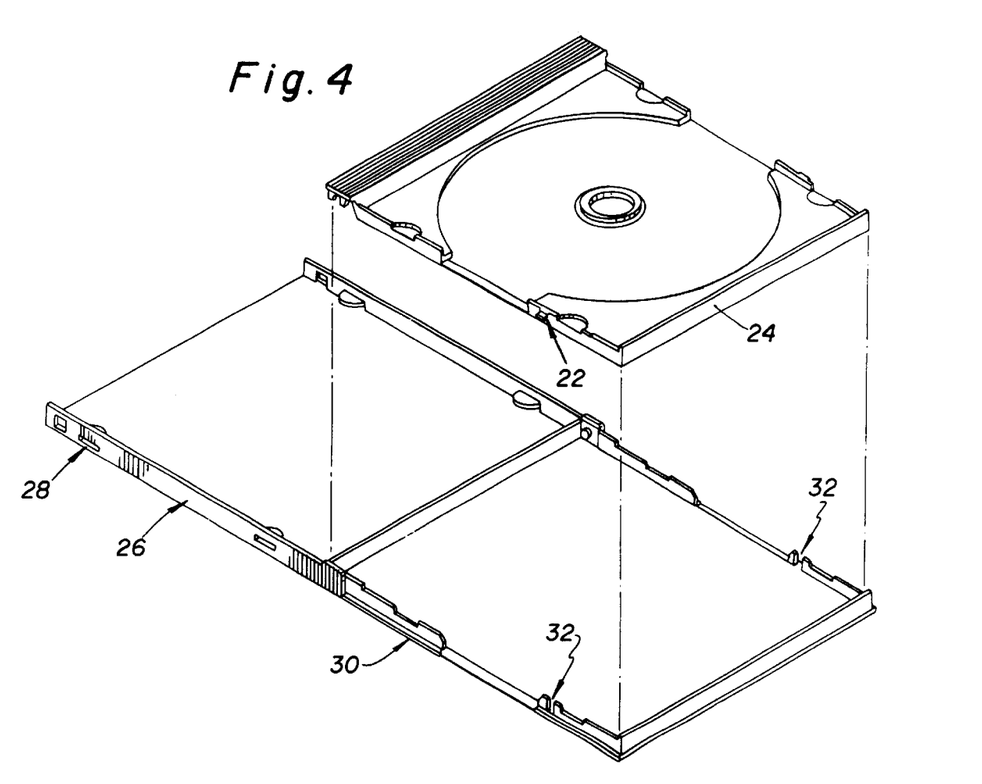

FIG. 4 shows another embodiment of the locking breakaway tab 22 as part of tray 24. Cover 26 has a slot or opening 28 through which locking tab 22 protrudes when the compact disc container is in the closed position. Base 30 has a cutaway 32 for lock tab 22 to fit onto base 30.

Figure 5:
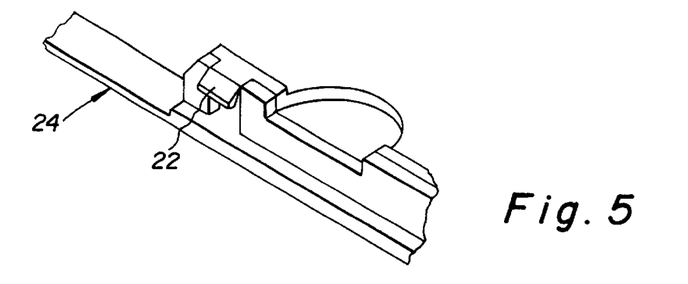

FIG. 5 is a schematic of the locking tab 22 as part of tray 24 in FIG. 4.

FIG. 6 is another sectional drawing of the compact disc container of FIG. 4 in the closed orientation position showing cover 26, base 30, and locking tab 22 on tray 24 in the engaged position. Opening 28 allows one to see if locking tab 22 is still in place, which would indicate container box had not been previously opened.

Figure 7:
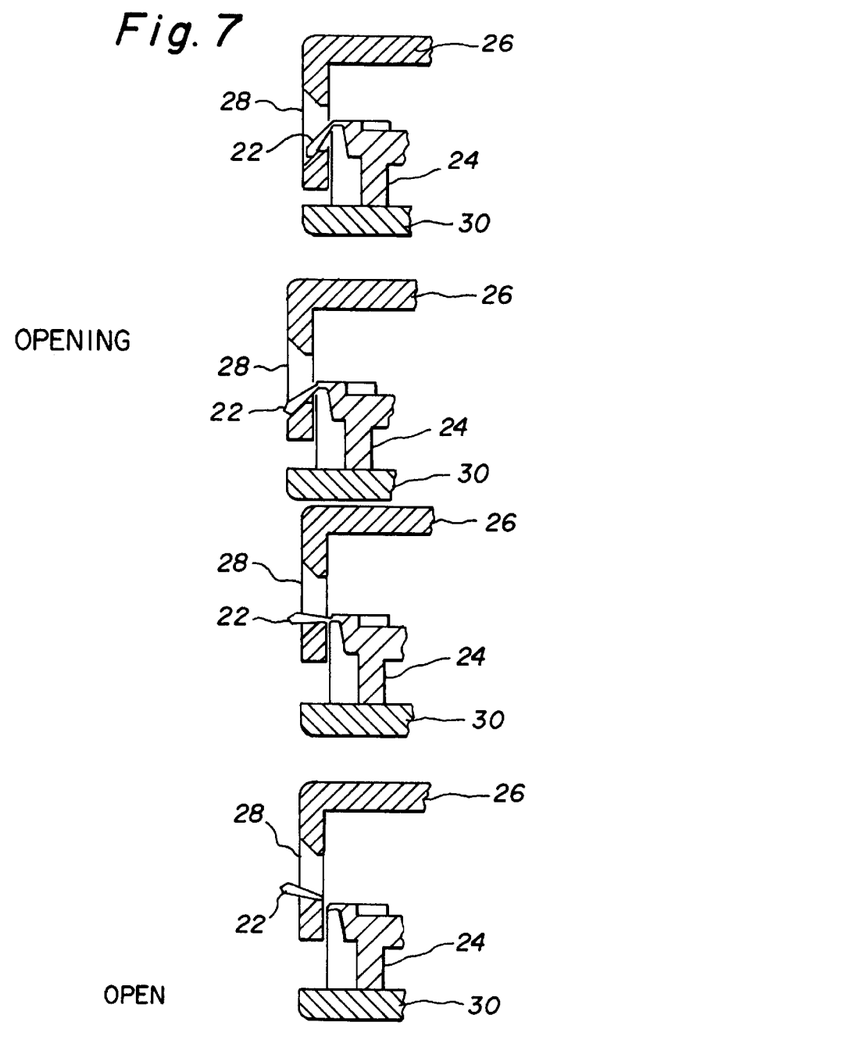

FIG. 7 schematically shows the sequence of the compact disc container of FIG. 6 as it is opening. As cover 26 is opening, it engages break-away tab 22, which can be seen through opening 28. break-away tab 22 is part of compact disc tray 24, and base 30 is the base component of the compact disc container. The last schematic of FIG. 7 (open) shows the break-away tab broken away from tray 24 as cover 26 is opened. By observing through opening 28 that break-away tab 22 is no longer in place, demonstrates that the container had been opened.

Figure 8:
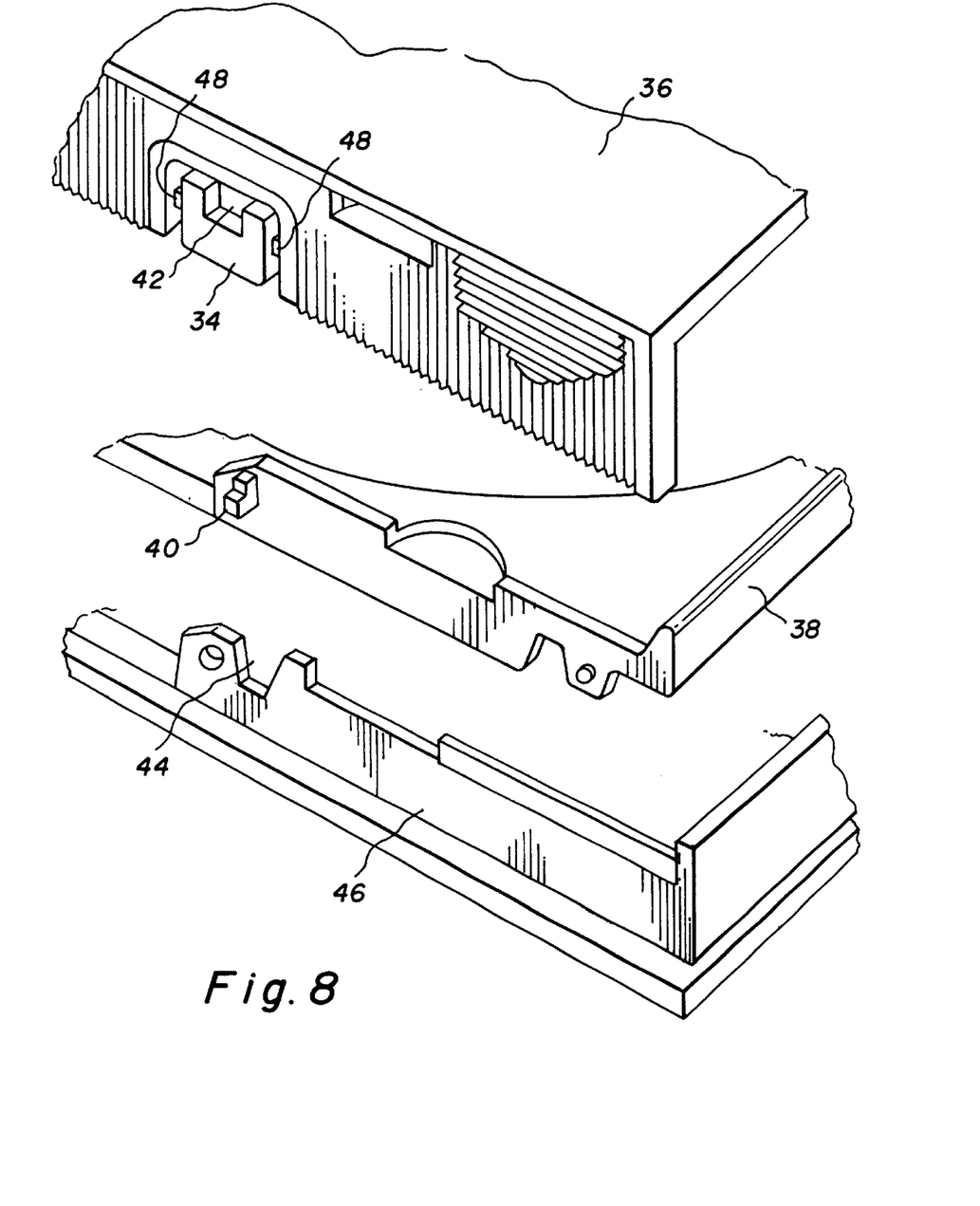

FIG. 8 shows another embodiment of this invention with break-away tab 34 as part of cover 36 of a compact disc container. Tray 38 has lip or back-up rib 40, which upon the container being in the closed position, protrudes through opening 42 of break-away tab 34. Rib 40 then fits into slot 44 of base 46. Connecting webs 48 attach break-away tab 34 to cover 36. Upon opening of cover 36, rib 40 breaks away tab 34, which then visually demonstrates that the container had been previously opened.

Figure 9:
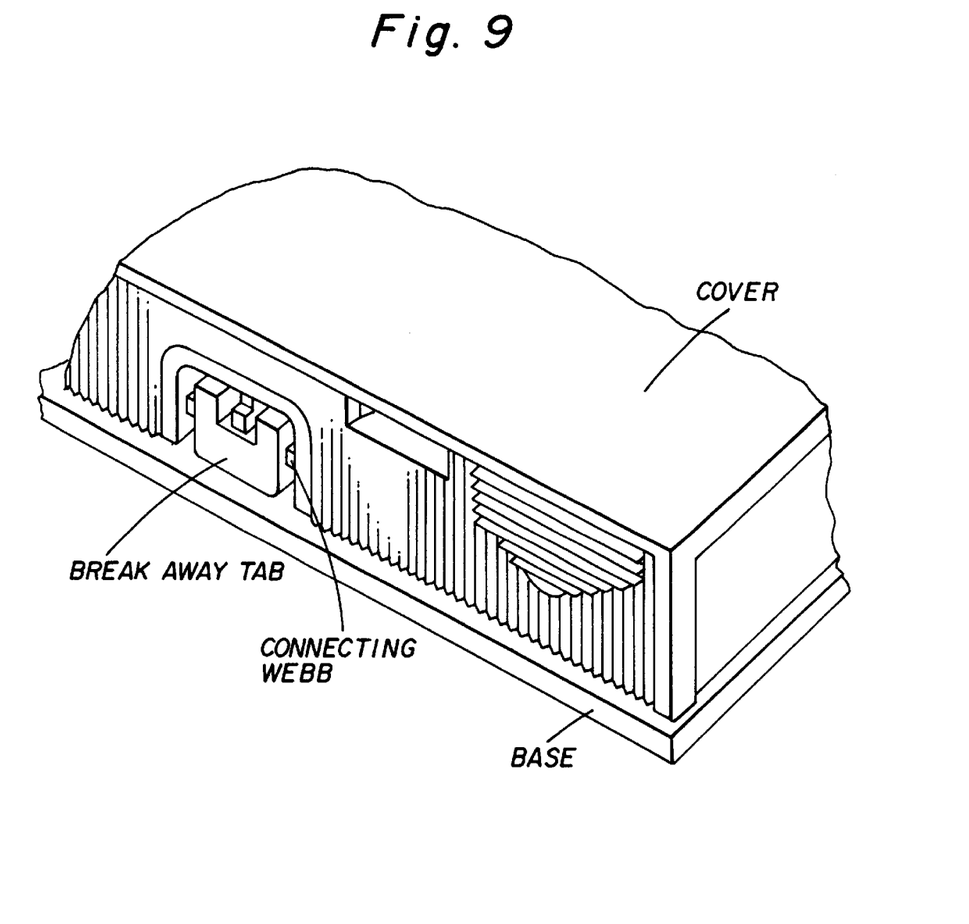

FIG. 9 is an expanded schematic drawing of the breakaway tab means of the embodiment shown in FIG. 8. FIG. 9 shows the compact disc container in the closed orientation position.

Figure 10:
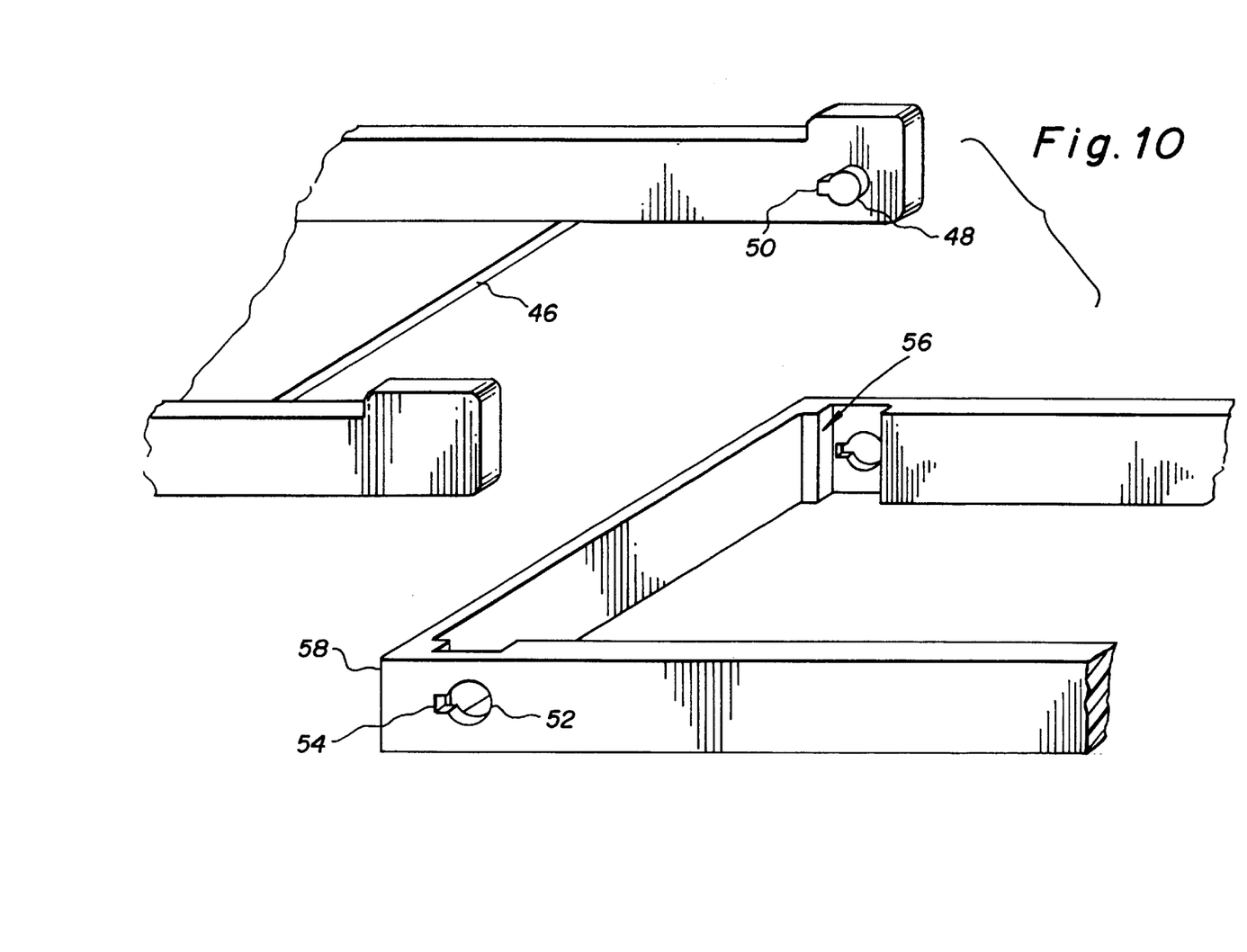

FIG. 10 schematically shows the locking hinge embodiment of this invention. Cover 46 has hinge pin 48 with key protrusion 50, which in the open position meshes with hinge opening 52 and key slot 54 such that key protrusion 50 fits through key slot 54. Undercut section 56 allows hinge pin 48 to freely rotate when closing cover 46 over base component 58. Thus, when the container is in the closed position, key protrusion 50 locks hinge section of compact disc container and thereby prevents entry into compact disc container from this section without breaking the key protrusion and/or hinge pin or breaking side panels of cover.

Figure 11A:
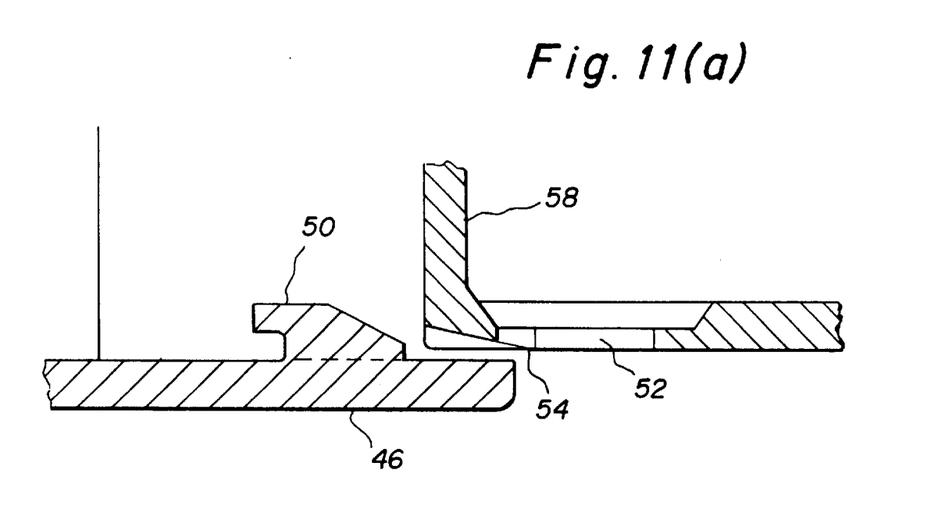
Figure 11B:
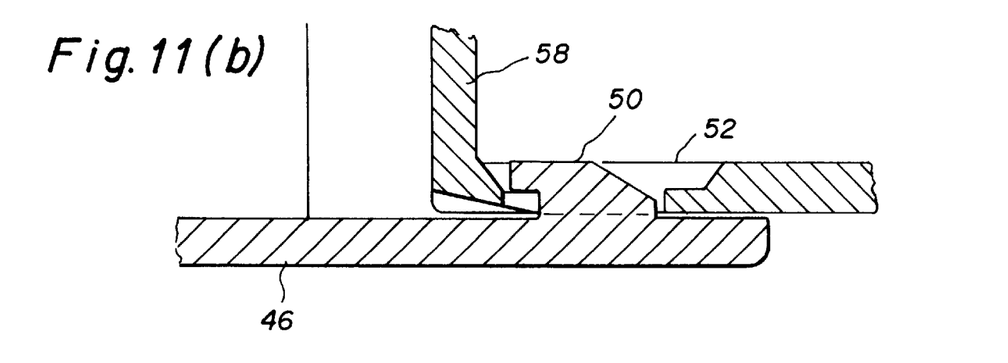
Figure 11C:
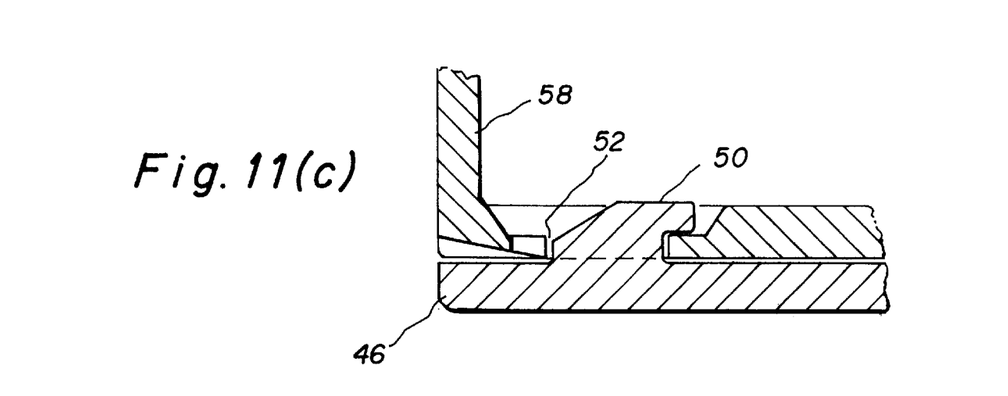

FIGS. 11(*a*), 11(*b*) and 11(*c*) are sequential top sectional drawings of one of the two hinge pins shown in FIG. 10. The top drawing FIG. 11(*a*) shows key 50 and key slot 52 and 54 of cover 46 and base 58 before engagement. The middle drawing FIG. 11(*b*) shows the base panel 58 and cover 46 snapped in place in the open orientation position. The bottom drawing FIG. 11(*c*) shows the base panel 58 and cover 46 in the closed orientation position by rotating the cover panel 180° with the key protrusion 50 locking the cover panel 46 to the base panel 58. Key 50 freely rotates through slot 52 upon closing cover 46 over base 58.

FIG. 12(*a*) is another embodiment of this invention showing the use of the break-away tab of this invention for plastic bottles with a cap closure. Cap 60 has window or slot 62 through which rib 64 protrudes upon sealing of bottle 66 with cap 60. Opening 68 is such that when the cap is opened by unscrewing thereof, section 70 will break away through openings 68.

FIG. 12(*b*) is a cut away sectional of the break-away tab through section A–A$^1$ showing cap 60 with window or slot 62 and rib 64 protruding through window 62 with breakaway tab 70.

What is claimed is:

1. In a molded thermoplastic storage container for receiving and holding at least one recording medium disc comprising a rectangular cover panel, a rectangular base panel and a storage tray mounted therebetween for receiving and holding at least one recording medium disc, and wherein said rectangular cover panel and said rectangular base panel each have side walls, and pivotable attachment means at one end of said rectangular panels; the improvement comprising a break away element consisting of a protrusion on the side wall of one said rectangular panel and a corresponding opening on the side wall of said other rectangular panel such that when said rectangular panels are in a closed orientation position, the protrusion on the side wall of one said rectangular panel engages the corresponding opening on the side wall of said other rectangular panel wherein said break away element breaks away upon initial opening of the storage container.

2. The storage container of claim 1 wherein the rectangular cover panel overlaps the rectangular base panel.

3. The storage container of claim 1 wherein the storage tray is removably attached to the rectangular base panel.

4. The storage container of claim 1 wherein the storage tray is pivotably attached at one end of at least one of the rectangular panels.

5. The storage container of claim 1 wherein the recording medium is a compact disc.

6. The storage container of claim 1 wherein the pivotable attachment means consists of a hinge pin having a protrusion thereon and said hinge pin being on one end of the side wall of one of the rectangular panels and a corresponding opening in the opposite side wall at the same end of the other of the rectangular panels such that said hinge pin on the side wall of one said rectangular panel and said corresponding opening in the opposite side wall of the other rectangular panel pivotably mesh with each other when the rectangular panels are in an open orientation position, and when the rectangular panels are in the closed orientation position, the protrusion on said hinge pin locks the storage container at said hinge pin.

7. The storage container of claim 6 wherein the protrusion on the hinge pin is a key that pivotably meshes with the corresponding opening and a key slot in the opposite side wall of the other rectangular panel.

8. The storage container of claim 6 wherein the protrusion is a fixed cam at the end of the hinge pin and pivotably meshes with the corresponding opening and a cam slot in the opposite side wall of the other rectangular panel.

9. The storage container of claim 1 wherein the pivotable attachment means at one end of the rectangular panels consists of a hinge pin on one end of one of the rectangular panels and a corresponding opening in the other rectangular panel at the end of said other panel so as to receive the hinge pin, said hinge pin having a protrusion on the circumferential surface of said hinge pin such as to provide a snap fit of the rectangular panels when in an open orientation position, and said rectangular panels being rotatable about said hinge pin upon opening and closing said rectangular panels.

10. In a molded thermoplastic storage container for receiving and holding at least one recording medium disc comprising a rectangular cover panel, a rectangular base panel and a storage tray for receiving and holding at least one recording medium disc, the rectangular cover panel, the rectangular base panel and the storage tray each have side walls and pivotable attachment means at one end thereof; the improvement comprising a break away element consisting essentially of a protrusion on one said side wall of the storage tray and an opening on the side wall of one of said rectangular panels such that when said rectangular panels are in a closed orientation position, the protrusion on the side wall of the storage tray engages the opening in the side wall of one of said rectangular panels such that said break away element breaks away upon initial opening of the storage container.

11. A storage box for compact disks comprising:

a base having a recess for receiving the compact disk;

a lid fitting over the base in a closed position to enclose the compact disk between the base and the lid;

a hinge joining the base and lid to permit the lid to swing away from the base in an open position providing access to the compact disk;

a detent operating between the base and lid to retain the lid and base in the closed position against the application of a first opening force; and a catch operating between the base and lid to retain the lid and base in the closed position against the application of a second opening force substantially greater than the first opening force.

12. The storage box as claimed in claim 11 wherein the catch is a tab protruding from one of the lid and base to be received in a mortise in the other of the lid and base, wherein the tab is adapted to break off upon the first opening of the lid and base.

13. The storage box as claimed in claim 12 wherein the lid is constructed of a transparent plastic and the base is constructed of a visually contrasting material and wherein the tab is affixed to the base and the mortise is in the lid so that the presence or absence of the tab may be detected visually when the lid and base are in the closed position.

14. The storage box as claimed in claim 11 wherein the hinge includes a pin protruding from one of the lid and base to be received in a socket in the other of the lid and base so that the pin may swivel about the hinge axis in the socket with opening and closing of the lid and base; and wherein the pins are terminated by a flange that prevents removal of the pins from the sockets with motion along the hinge axis.

* * * * *